(No Model.) 2 Sheets—Sheet 1.

W. ROGERS.
FLOOR FOR ROLLING MILLS, GLASS HOUSES, &c.

No. 256,053. Patented Apr. 4, 1882.

Witnesses—

Inventor—
William Rogers
by James I. Kay
Attorney (No Model.) 2 Sheets—Sheet 2.

W. ROGERS.
FLOOR FOR ROLLING MILLS, GLASS HOUSES, &c.

No. 256,053. Patented Apr. 4, 1882.

Witnesses
F. G. Kay
N. C. Stittwagen

Inventor
William Rogers
by James T. Kay
Attorney

UNITED STATES PATENT OFFICE.

WILLIAM ROGERS, OF LEECHBURG, PENNSYLVANIA, ASSIGNOR TO HIMSELF AND WILLIAM H. ROGERS, OF SAME PLACE.

FLOOR FOR ROLLING-MILLS, GLASS-HOUSES, &c.

SPECIFICATION forming part of Letters Patent No. 256,053, dated April 4, 1882.

Application filed January 14, 1882. (No model.)

*To all whom it may concern:*

Be it known that I, WILLIAM ROGERS, of Leechburg, in the county of Armstrong and State of Pennsylvania, have invented a new and useful Improvement in Floors for Rolling-Mills, Glass-Houses, &c.; and I do hereby declare the following to be a full, clear, and exact description thereof, reference being had to the accompanying drawings, forming a part of this specification, in which—

Figure 1:
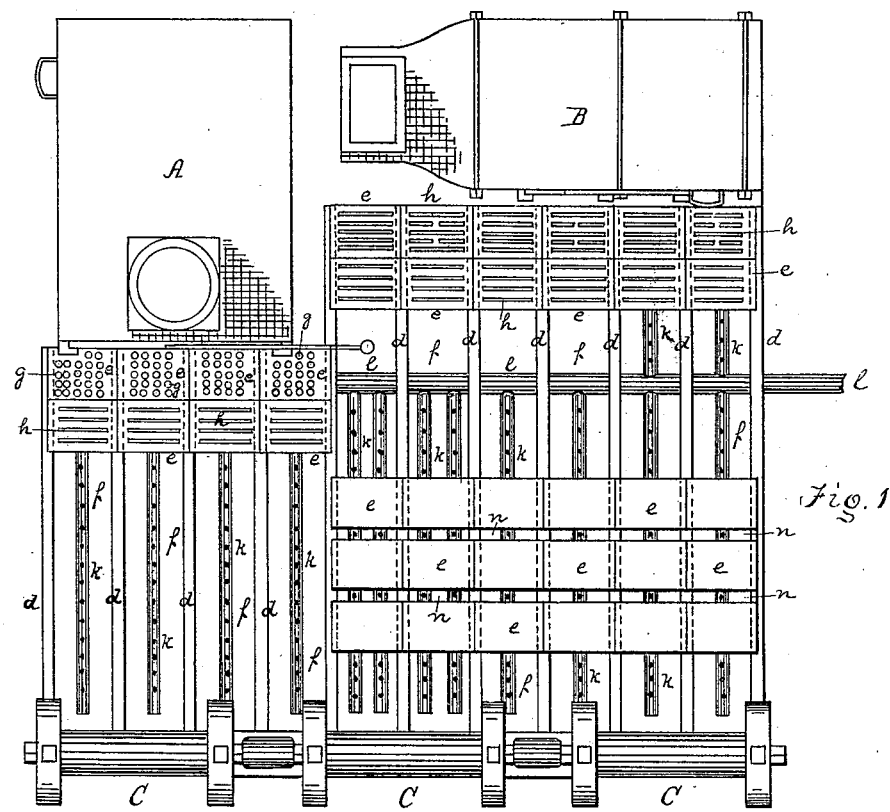
Figure 2:
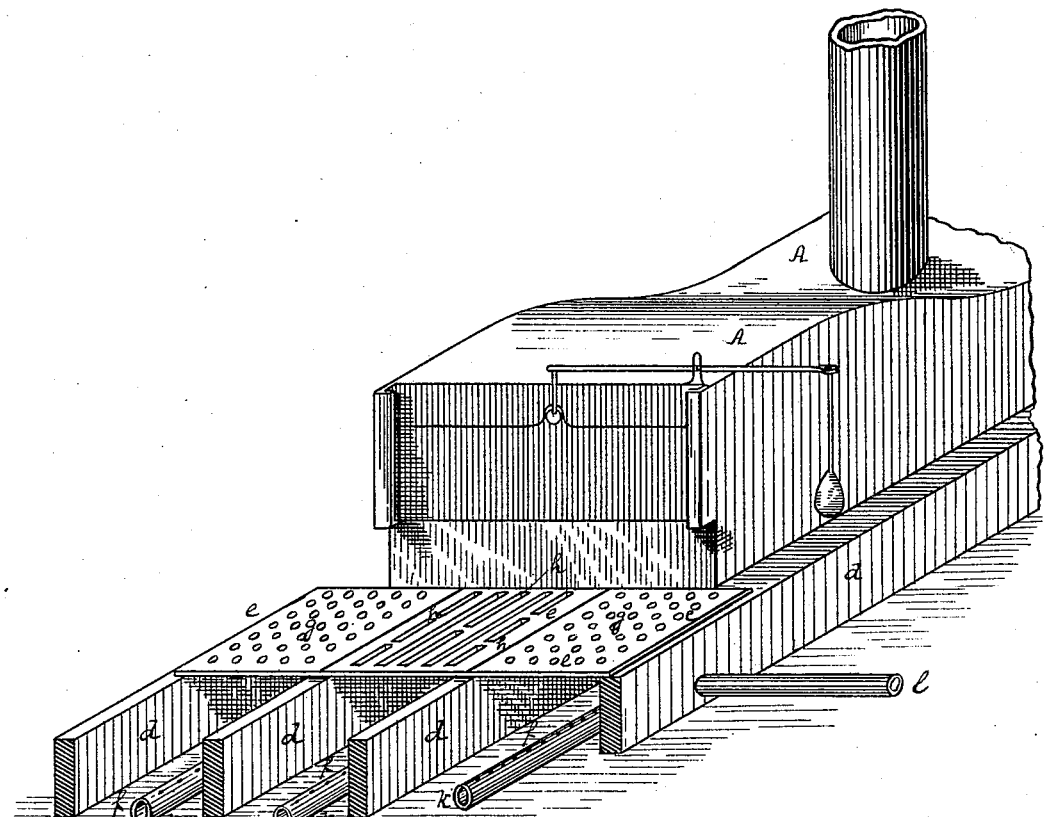

Figure 1 is a plan view of part of a mill, illustrating my invention. Fig. 2 is a perspective view, partly in section, illustrating the same.

Like letters of reference indicate like parts in each.

My invention relates to certain improvements in the floors of rolling-mills, glass-houses, and like places where, on account of the heat from furnaces or that radiated from the material operated upon, the floors or the air in the buildings becomes so hot as to discommode and become exceedingly wearing on the workmen. In these mills and like places the floors have generally been formed of metal plates resting on the ground, or of brick or tile, which would absorb the heat from the furnaces or from the metal or other material dragged over or resting upon them and become so hot that the workmen experienced great difficulty in standing on them and working. The air in the buildings also became so heated by radiation from the furnaces and floor as to make the work exceedingly laborious, so that the workmen could not make full time in hot weather, and the whole operations of the mill were delayed from this cause.

Heretofore attempts have been made to keep the air of the mills and works cool by means of blasts of air delivered from above upon the workmen. These, however, did not act to cool the floors, and were often the cause of sickness on account of the chilling effect of the strong blasts and drafts on them when overheated. The object of my invention is, first, to keep these floors cool, so as to relieve the workmen from heat from below; and, second, to supply the workmen with fresh air rising from below and replacing that heated by radiation from the furnaces, metal, or floor.

My invention consists essentially in a floor for rolling-mills and like places formed of metal plates supported above an air space or chamber, and a pipe or series of pipes for discharging air within the air-chamber, the air then rising between the plates or through perforations or openings therein, cooling the plates, and supplying fresh air to the workmen.

To enable others skilled in the art to make and use my invention, I will describe the same more fully.

My invention is illustrated in connection with a rolling-mill, A being a furnace for heating plates or sheets, B a heating or puddling furnace, and C a train of sheet or other rolls.

In the ordinary rolling-mills the finishing-rolls were located about thirty feet from the furnace, and the floor between the furnace and rolls was composed of cast-metal plates, which were sometimes perforated to lighten them, but rested directly on the ground or supporting-surface. The heated piles, billets, or sheets were dragged over these plates and fed to the rolls and rested on them in cooling, and the plates were consequently often so heated that it was almost impossible to stand on them, and the heat from the furnaces was also absorbed by the plates immediately around them, adding by radiation to the heating from the furnaces themselves.

In my improved floor I first build a series of walls, *d d*, extending from the furnaces to the rolls or across the space between them, the walls being from two to three feet apart according to the width of the plates to be supported, and being of height corresponding to the depth of the air space or chamber desired below the plates, a chamber two feet in depth being generally found sufficient for all purposes. On these walls I support a series of cast-metal plates, *e*, the edges of the plates resting on the walls and thus forming the air spaces or chambers *f*. The plates *e* are generally formed with perforations, as at *g*, or slots, as at *h*, to permit the passage of air up through the plates, as hereinafter described. The plates may, however, be made solid, and spaces *n* left between them to permit the escape of the air, though so even a distribution of the air and so slight a draft or current are not obtained in this manner. Extending along the base of each of these air-chambers $f$ is one or a series of air-pipes, $k$, which connect in a suitable manner with a main pipe, $l$, through which air is forced from a fan or air-pump. (Not shown.) These air-pipes $k$ are either perforated along the top or have a narrow slit formed along the same for the escape of the air, and a valve or cock may also be provided to regulate the flow of the air through the pipes. The number of pipes is of course regulated by the size of the pipes and the amount of air to be supplied.

When my improved floor is employed the air escaping from the air-pipes $k$ rises in the air-chambers $f$ against the under surface of the metal plates $e$ and passes up through the perforations or openings in the plates or spaces between them, thus serving to keep the plates cool, and on account of the constant fresh supply of air carrying up and off any heat absorbed by the plates from the furnaces or metal dragged over or resting on them. The air escaping from the air-pipes is naturally distributed through the air-chambers, and therefore comes in contact with and cools the entire surface of the plates exposed, and is also evenly distributed as it rises through the plates. The plates are thus kept at a low temperature, so that no inconvenience is experienced in standing or working on them. As the air rises through or between the plates it replaces and drives upward the air heated by the furnaces or metal and furnishes a constant and regular supply of fresh cool air to the workmen, enabling them to carry on their operations with ease and comfort, so that they are able to work much longer without fatigue or exhaustion and to make full time at such arduous operations as puddling, heating, or rolling even in hot weather.

Practical experience has demonstrated that where mills are fitted with my improved floor no time need be lost on account of the excessive and exhausting heat of the mills, which is of great importance both to the manufacturer and employé. As the air from the air-pipes is distributed in the air-chambers before rising through the plates, the upward current is but slight and not sufficient to chill or injuriously affect the workmen. As any dirt falling on the metal plates may fall through the perforations or openings into the air-chamber below, there is no liability of these openings becoming clogged and preventing the passage of the air.

If desired, the air may be cooled by artificial means before being delivered through the air-pipes; but this is seldom necessary.

My improved mill-floor may be employed to advantage in glass-houses, forges, smelting-works, and in any places where the heat from the furnaces or material is found oppressive to the men.

What I claim as my invention, and desire to secure by Letters Patent, is—

1. In a floor for rolling-mills and like works, the combination of metal plates supported above an air space or chamber and air pipe or pipes in said air-chamber adapted to discharge air in such manner as to rise through or between said plates, substantially as and for the purposes set forth.

2. In a floor for rolling-mills and like works, the combination of metal plates supported above an air space or chamber and air-discharging pipe or pipes in said air-chamber, the metal plates having perforations or openings for the escape of air from the air-chamber, substantially as and for the purposes set forth.

In testimony whereof I, the said WILLIAM ROGERS, have hereunto set my hand.

WILLIAM ROGERS.

Witnesses:
JAMES I. KAY,
F. G. KAY.